June 27, 1967     E. D. DALL     3,328,080
SEAT WITH SEAT BELTS
Filed Feb. 14, 1963     2 Sheets-Sheet 1
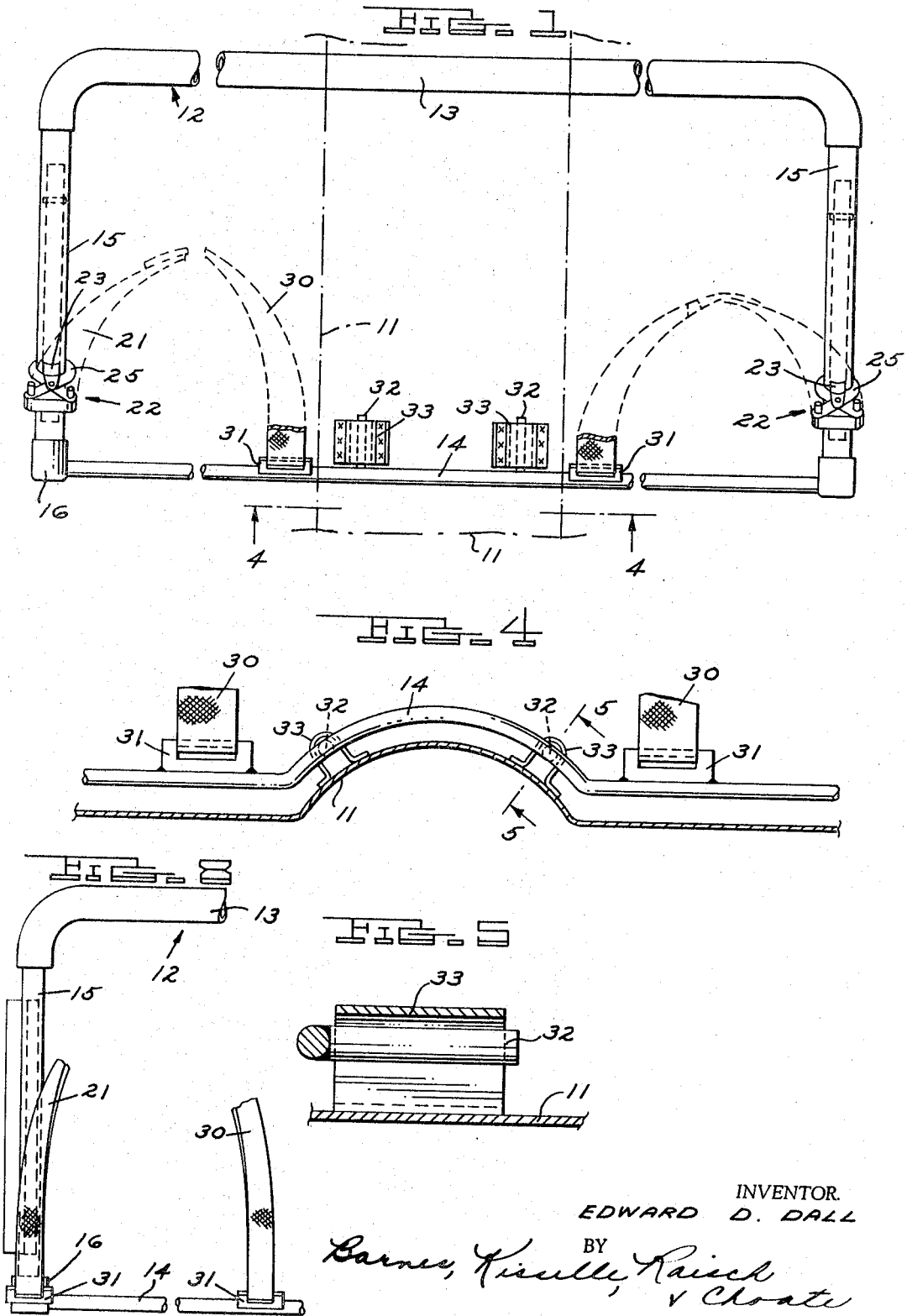
INVENTOR.
EDWARD D. DALL
ATTORNEYS

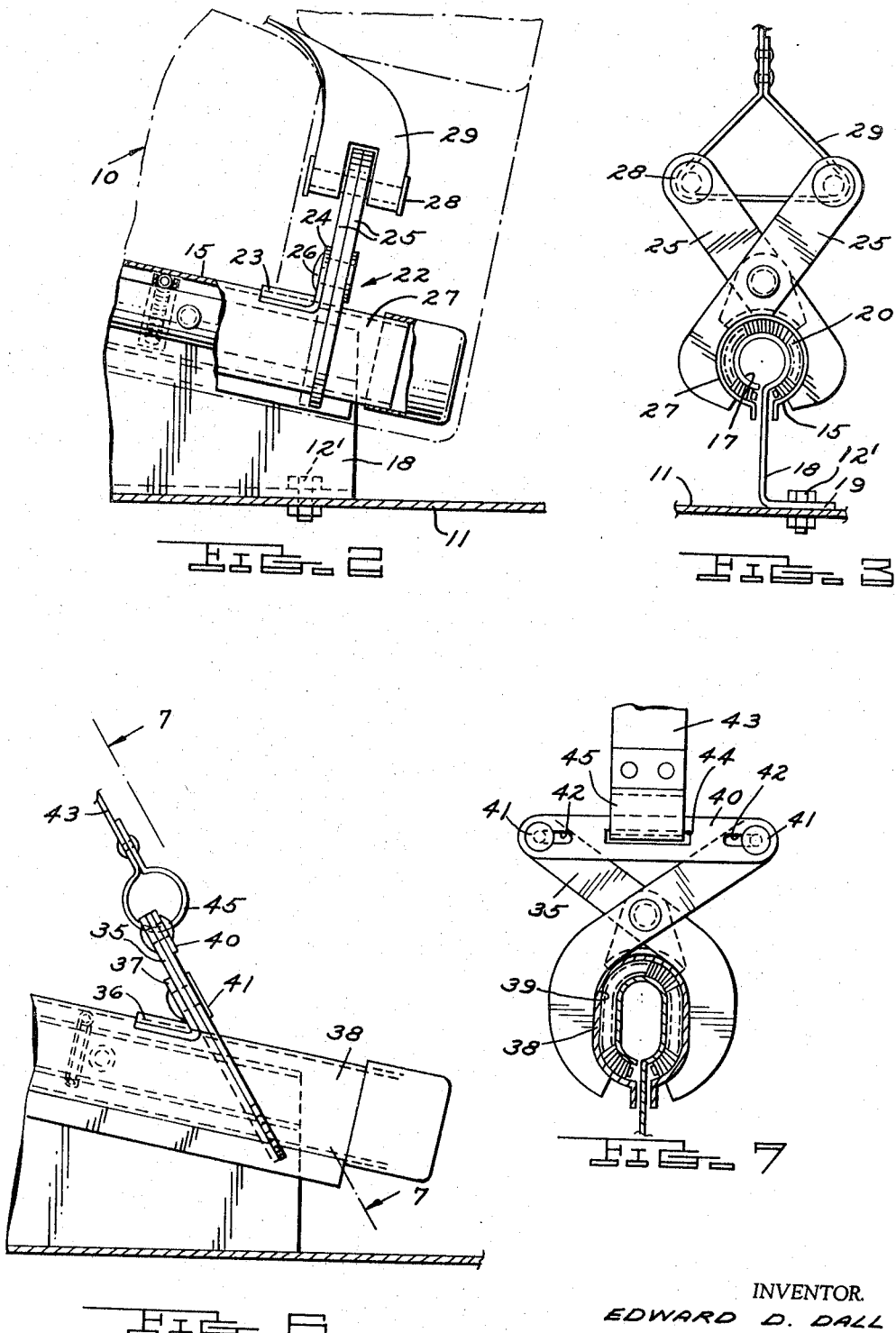

United States Patent Office 3,328,080
Patented June 27, 1967

3,328,080
SEAT WITH SEAT BELTS
Edward D. Dall, 30370 Vernon Drive, Birmingham, Mich. 48010; Beatrice L. Dall, administratrix of said Edward D. Dall, deceased
Filed Feb. 14, 1963, Ser. No. 258,468
9 Claims. (Cl. 297—385)

This application is a continuation-in-part of my copending application Ser. No. 115,389, filed June 7, 1961, now abandoned.

This invention relates to seats for automotive vehicles and particularly to seats with seat belts.

The effectiveness of seat belts in increasing the safety of passengers in automotive vehicles has resulted in their increased use in recent times. Customarily, the ends of the seat belts are fixed to a portion of the vehicle frame. In such an arrangement, the seat must be adjusted into proper position and then the seat belts must be fastened about the passenger. Otherwise, it is necessary to loosen the seat belts from about the passenger to adjust the seat. Obviously, such an arrangement is disadvantageous where it is desired to adjust the seat in normal travel of the vehicle as is often recommended in order to relieve tension on the driver and passenger. Heretofore it has not been possible to fasten the seat belt directly to the seat frame because of lack of strength of the seat carriage which tends to pull off the seat track of the vehicle when a force is applied thereto such as would occur if a passenger were held in the seat by a seat belt. In seat track constructions wherein the seat carriage is telescoped over the seat track, the force on the seat carriage tends to cause the seat carriage to open up and pull off the seat track over which it is telescoped.

It is an object of this invention to provide a seat having seat belts which are fastened directly to the seat frame without the inherent disadvantages of the prior art construction.

It is a further object of the invention to provide such an arrangement which is relatively low in cost.

In the drawings:

FIG. 1 is a fragmentary plan view of a seat embodying the invention.

FIG. 2 is a fragmentary end view on an enlarged scale of the seat shown in FIG. 1.

FIG. 3 is an end view of FIG. 2.

FIG. 4 is a fragmentary sectional view taken along the line 4—4 in FIG. 1.

FIG. 5 is a fragmentary sectional view on an enlarged scale taken along the line 5—5 in FIG. 4.

FIG. 6 is a view similar to FIG. 2 of a modified form of the invention.

FIG. 7 is a fragmentary sectional view taken along the line 7—7 in FIG. 6.

FIG. 8 is a fragmentary plan view of a further modified form of seat construction.

In my copending application Ser. No. 115,389, filed June 7, 1961 of which this application is a continuation-in-part, there is disclosed a seat and seat track mechanism wherein the carriage portion of the seat track mechanism forms a structural part of the seat frame. The increased strength of the seat track mechanism resulting from such a construction is utilized in the present invention as a base for mounting the seat belt.

As shown in FIGS. 1 and 2, seat 10 is mounted adjustably on the floor 11 of the vehicle and comprises a frame 12 that supports the seat cushion or other upholstery to form the complete seat.

As shown in FIG. 1, the frame 12 comprises a tubular front rail 13, a tubular rear rail 14 and side rails 15 joining the ends of the front and rear rails 13, 14. As mounted on the vehicle, the side rails 15 extend upwardly and forwardly.

Side rails 15 form an integral structural part of the seat frame and the seat adjusting mechanism. As shown in FIG. 2, each side rail 15 is generally tubular and has its forward ends thereof telescoped into and welded to the bent end portions of the front rail 13 and the rear ends thereof fastened to the rear rail 14 by welding to brackets 16 into which the ends of the rear rail 14 and side rails 15 are telescoped.

Each side rail 15 comprises a split tube (FIG. 3) which is telescoped over a tubular support 17 formed integrally with the upper end of a web 18 which extends between the ends of the split tube. The lower end of the web 18 is bent laterally as at 19 and is fastened to the floor 11 by bolts 12' at longitudinally spaced points.

As shown in FIGS. 2 and 3, roller bearing assemblies 20 are provided at longitudinally spaced points between the inner surface of the side rails 15 and the outer surface of the tubular support 17. The roller bearing assemblies may be of the type shown in my Patent 3,007,668, issued Nov. 7, 1961 or my prior patent applications Ser. No. 38,304, filed Feb. 9, 1959, now Patent 3,120,371 and Ser. No. 115,389, filed June 7, 1961. Basically, such bearing assemblies comprise roller bearing means extending transversely with guide means for guiding the roller bearing means independently of the tubular support and tubular carriage. In my Patent 3,007,668, the roller bearing means comprise tightly wound springs. In my application Ser. No. 38,304, contiguous discrete rollers are also shown.

Suitable interengaging means are provided between the rail 15 and support 17 to lock the seat on the support as shown in the aforementioned patent and patent applications.

Referring to FIGS. 1 and 2, according to the invention, one end of one of each of the seat belts 21 is fastened to a seat belt mounting device 22 that is, in turn, mounted on each side rail 15. Device 22 comprises a bracket 23 welded to the top surface of the side rail 15 and including an upstanding portion 24 on which a pair of arms or tongs 25 are pivoted by a rivet 26 with the plane of tongs at a generally right angle to the axis of the side rails 15. The lower ends of the arms 25 are formed with arcuate inner surfaces 27 having substantially the same radius of curvature as the outer surface of the side rail 15.

The end of the seat belt 21 is fastened to the upper ends of the tongs 25 in such a manner that an upward force on the seat belt 21, as might occur as by the load of the weight of the passenger, tends to cause the lower ends of the tongs 25 to encircle and tightly grip the outer surface of the side rail 15. This opposes the tendency of the side rails 15 to open up under the action of an upward force and thereby permits the attachment of the seat belts 21 to the side rails. Specifically, as shown in FIGS. 2 and 3, pins 28 are fastened to and extend outwardly from the upper ends of the tongs 25 and a split loop 29 on the end of the seat belt 21 extends over the pins 28 so that when an upward force is applied to the seat belt, the upper ends of the tongs 25 tend to move inwardly.

As shown in FIG. 4, the seat belts 30 are fixed to the rear rail 14 by brackets 31. Each seat belt 21 is releasably fastened to its respective seat belt 30 by a conventional readily disengageable buckle as is well known in the art.

Since in two-door vehicles if the frame 12 is of light weight, there may be a tendency for the center of the frame 12 to move upwardly under force applied to the seat belt, interengaging means are provided between the frame and the floor to limit any movement of the seat frame 12 upwardly relative to the floor 11. As shown in FIGS. 4 and 5, this comprises members 32 extending forwardly from the rear rail 14 into U-shaped brackets 33 fixed to the floor 11 of the vehicle. Normally, the members 32 do not engage the bracket 33. However, in case of excessive force on the seat frame 12, upwardly relative to the floor 11 of the vehicle, the members 32 engage the upper ends of the brackets 33 and limit and prevent any further movement of the frame.

In the form of the invention shown in FIG. 6, the tongs 35 are pivoted to a bracket 36 which has its flange 37 extending upwardly and forwardly so that the plane of the tongs 35 is at an acute angle to the axis of the side rails extending upwardly and forwardly. In the form of the invention shown in FIG. 7, tubular side rail 38 is generally oval in cross section and the lower ends of the tongs 35 have their inner surfaces 39 of corresponding curvature. A rigid link 40 is slidably and pivotally fastened to the upper ends of the tongs 35 by an arrangement which includes pins 41 on the tongs 35 which extend through slots 42 on the link 40. The end of each seat belt 43 is fastened through a slot 44 by a loop 45 on the lower end of the seat belt 43. In this form of the invention, as in the previous form, any upward force on the seat belt 43 extends to move the link 40 upwardly causing the inner ends of the tongs 35 to move toward one another and causing the lower ends of the tongs to grip the outer surface of the side rail 38 and prevent the side rails from opening up.

Although the invention has been described in connection with an arrangement wherein the seat carriage forms an integral part of the seat frame, certain of the advantages of the invention can be gained by applying the tong arrangement to any seat track arrangement wherein one member is telescoped over another. In such constructions, the tongs are utilized to prevent the member which is telescoped over the other from opening up due to force applied thereto.

The inherent strengthening of the tubular side rail 15 by forming it as a part of the seat frame can be utilized as in the form of the invention shown in FIG. 8 to permit fastening of the seat belt directly to the bracket 16, without the use of tongs. In this form, the tube 15 is not reinforced by tongs but is strengthened and stiffened by being formed as part of the seat frame so that it is possible to mount the seat belt directly to the seat frame and meet the desired load requirement.

It can thus be seen that there has been provided a seat belt arrangement which overcomes the inherent disadvantages which have heretofore prevented the attachment of seat belts directly to the seat frame.

I claim:

1. In a seat having a base frame comprising a front structural rail, a rear structural rail spaced from the front rail, and side structural rails joining the ends of said front and rear rails to provide a rigid base frame, each said side rail being substantially tubular, a tubular support adapted to be fixed to the floor of a vehicle or the like adjacent each said side rail, each said side rail being telescoped over its respective support, roller bearing means interposed between the surfaces of said tubular support and said side rail at longitudinally spaced points along said side rail, the improvement comprising
a seat belt attaching device mounted on each said side rail,
said device comprising a bracket fixed on said side rails,
a pair of tong members pivoted to said bracket and adapted to at least partially encircle said side rail,
a seat belt,
and means for fastening said seat belt to said tong members in such a manner that a force on said seat belt causes said tong members to grip the side rail.

2. The combination set forth in claim 1 wherein said means for fastening said seat belt to said tongs comprises pins on the outer ends of said tongs and said belt having a loop formed thereon extending over said pins.

3. The combination set forth in claim 1 wherein the plane of said tongs is at generally a right angle to the axis of said side rail.

4. The combination set forth in claim 1 wherein the plane of said tongs is angularly related to said side rail and extends upwardly and forwardly relative to said seat frame.

5. The combination set forth in claim 1 wherein said means for fastening said seat belt to said tongs comprises a link pivotally and slidably connected to the upper ends of said tongs,
said belt being fastened to said link.

6. The combination comprising a seat having a base frame comprising a front structural rail,
a rear structural rail spaced from the front rail,
and side structural rails joining the ends of said front and rear rails to provide a rigid base frame,
each said side rail being substantially tubular,
a tubular support adapted to be fixed to the floor of a vehicle or the like adjacent each said side rail,
each said side rail being telescoped over its respective support,
bearing means interposed between the surfaces of said tubular support and said side rail,
a seat belt attaching device mounted on each said side rail,
said device comprising a pair of tong members pivoted to each side rail and adapted to at least partially encircle said side rail,
a seat belt,
and means for fastening said seat belt to said tong members in such a manner that a force on said seat belt causes said tong members to grip the side rail,
means for attaching a seat belt to said rear structural rail of said seat frame,
and interengaging means between said seat frame and the floor of the vehicle adjacent said last-mentioned seat belt for limiting upward movement of said seat frame relative to said vehicle.

7. The combination comprising a seat having a base frame comprising a front structural rail,
a rear structural rail spaced from the front rail,
and side structural rails joining the ends of said front and rear rails to provide a rigid base frame,
each said side rail being substantially tubular,
a tubular support adapted to be fixed to the floor of a vehicle or the like adjacent each said side rail,
each said side rail being telescoped over its respective support,
roller bearing means interposed between the surfaces of said tubular support and said side rail at longitudinally spaced points along said side rail,
a seat belt attaching device mounted on each said side rail,
said device comprising a bracket on each said rail,
a pair of tong members pivoted to each said bracket and adapted to at least partially encircle said side rail,
a seat belt,
and means for fastening said seat belt to said tong members in such a manner that a force on said seat belt causes said tong members to grip the side rail,
said means for fastening said seat belt to said tongs comprising a rigid link pivotally and slidably connected to the upper ends of said tongs,
said belt being connected to said link.

8. In a seat having a base frame comprising a front structural rail, a rear structural rail spaced from the front rail, and side structural rails joining the ends of said front and rear rails to provide a rigid base frame, each said side rail being substantially tubular, a tubular support adapted to be fixed to the floor of a vehicle or the like adjacent each said side rail, each said side rail being telescoped over its respective support, roller bearing means interposed between the surfaces of said tubular support and said side rail at longitudinally spaced points along said side rail, the improvement comprising a seat belt attaching device mounted on each said side rail, said device comprising means mounted on said side rails and having portions adapted to at least partially encircle said side rails, a seat belt, and means for fastening said seat belt to said last mentioned means in such a manner that a force on said seat belt causes said portions to grip said side rail and prevent said side rail from spreading open and pulling off its said support under extreme pressure.

9. The combination set forth in claim 7 wherein the plane of said tongs is angularly related to said side rail and extends upwardly and forwardly relative to said seat frame.

References Cited

UNITED STATES PATENTS

| | | | |
|---|---|---|---|
| 1,987,431 | 1/1935 | Browne | 297—344 |
| 2,066,557 | 1/1937 | Cox | 248—429 |
| 2,312,030 | 2/1943 | Cramer et al. | 248—430 |
| 2,510,115 | 6/1950 | Jakosky | 297—385 |
| 2,780,501 | 2/1957 | Rosenberg | 248—430 |
| 2,924,405 | 2/1960 | Daglish et al. | 244—122 |
| 2,932,871 | 4/1960 | Phillips et al. | 297—385 |
| 2,945,275 | 7/1960 | Almeter | 297—385 |
| 2,947,353 | 8/1960 | Von Wimmersperg | 297—388 |
| 2,953,190 | 9/1960 | Tanaka | 248—429 |
| 3,007,668 | 11/1961 | Dall | 312—341 X |
| 3,089,564 | 5/1963 | Smittle | 297—386 X |
| 3,120,371 | 2/1964 | Dall | 248—430 X |
| 3,126,227 | 3/1964 | Bollinger | 297—385 |
| 3,126,228 | 3/1964 | Greene et al. | 297—385 |
| 3,207,554 | 9/1965 | Dall. | |

FOREIGN PATENTS 1,094,483   12/1954   France.

DAVID J. WILLIAMOWSKY, *Primary Examiner.*

J. T. McCALL, R. B. FARLEY, *Assistant Examiners.*